Nov. 23, 1954 — R. E. NISBET — 2,694,892
COTTON-PICKING MACHINE
Filed April 30, 1952 — 3 Sheets-Sheet 1
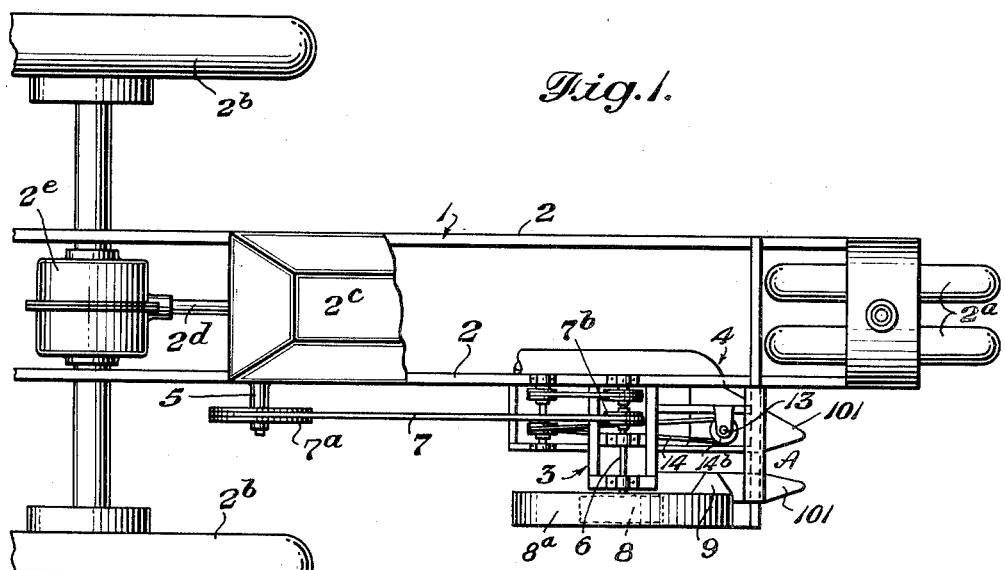
Fig. 1.
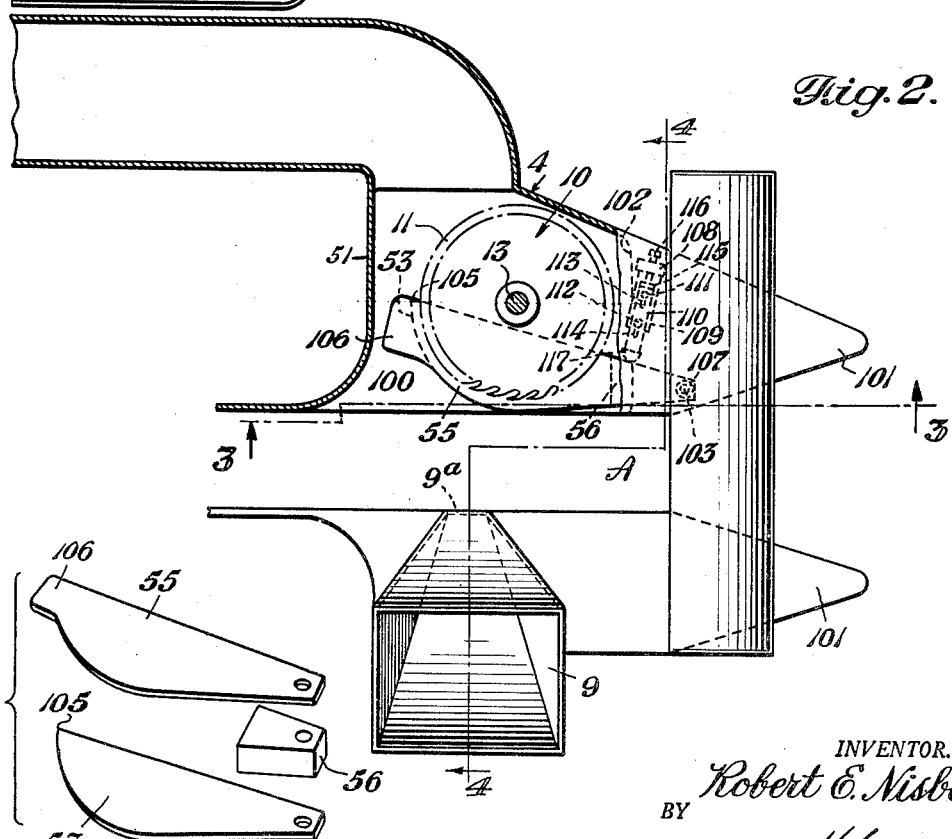
Fig. 2.
Fig. 5.
INVENTOR.
Robert E. Nisbet
BY
ATTORNEY.

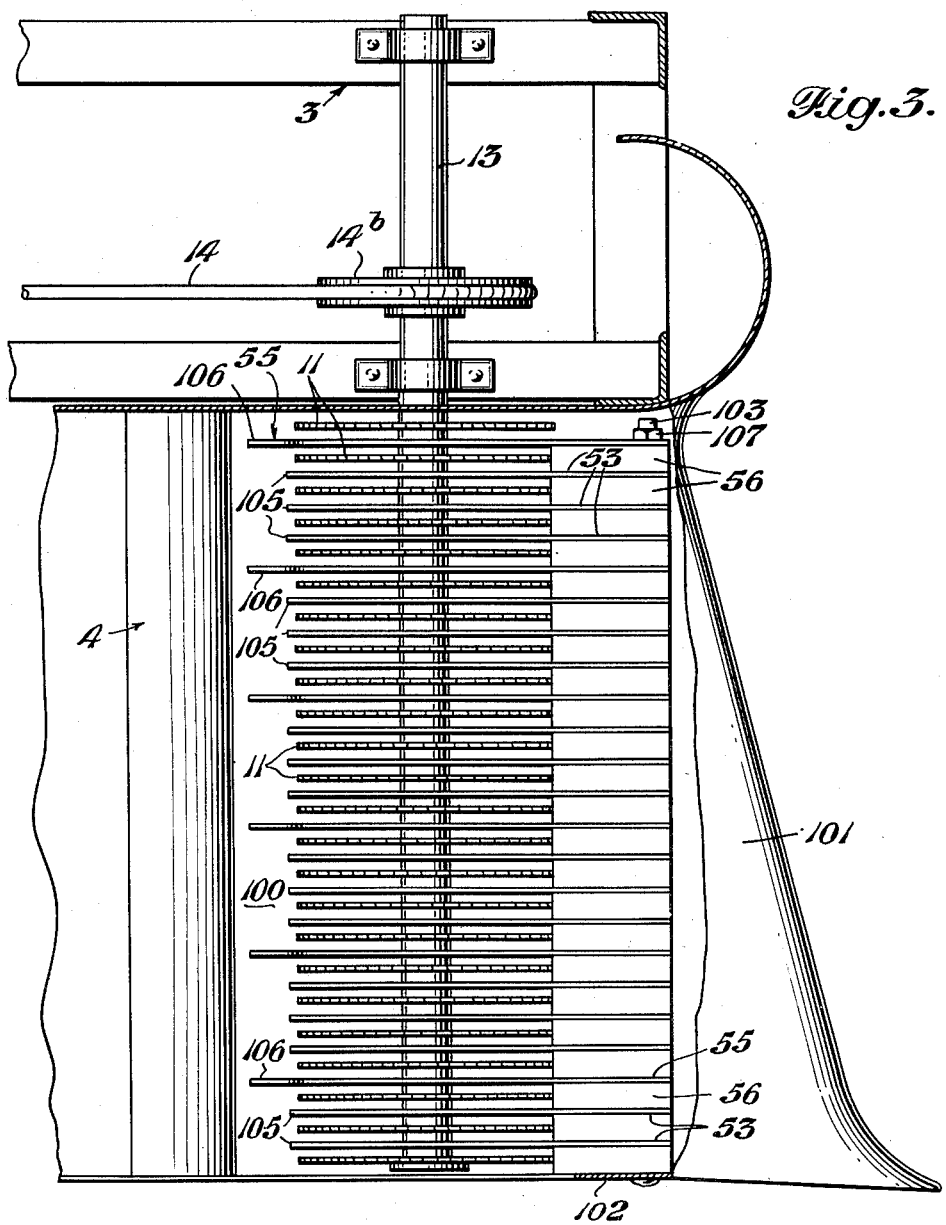

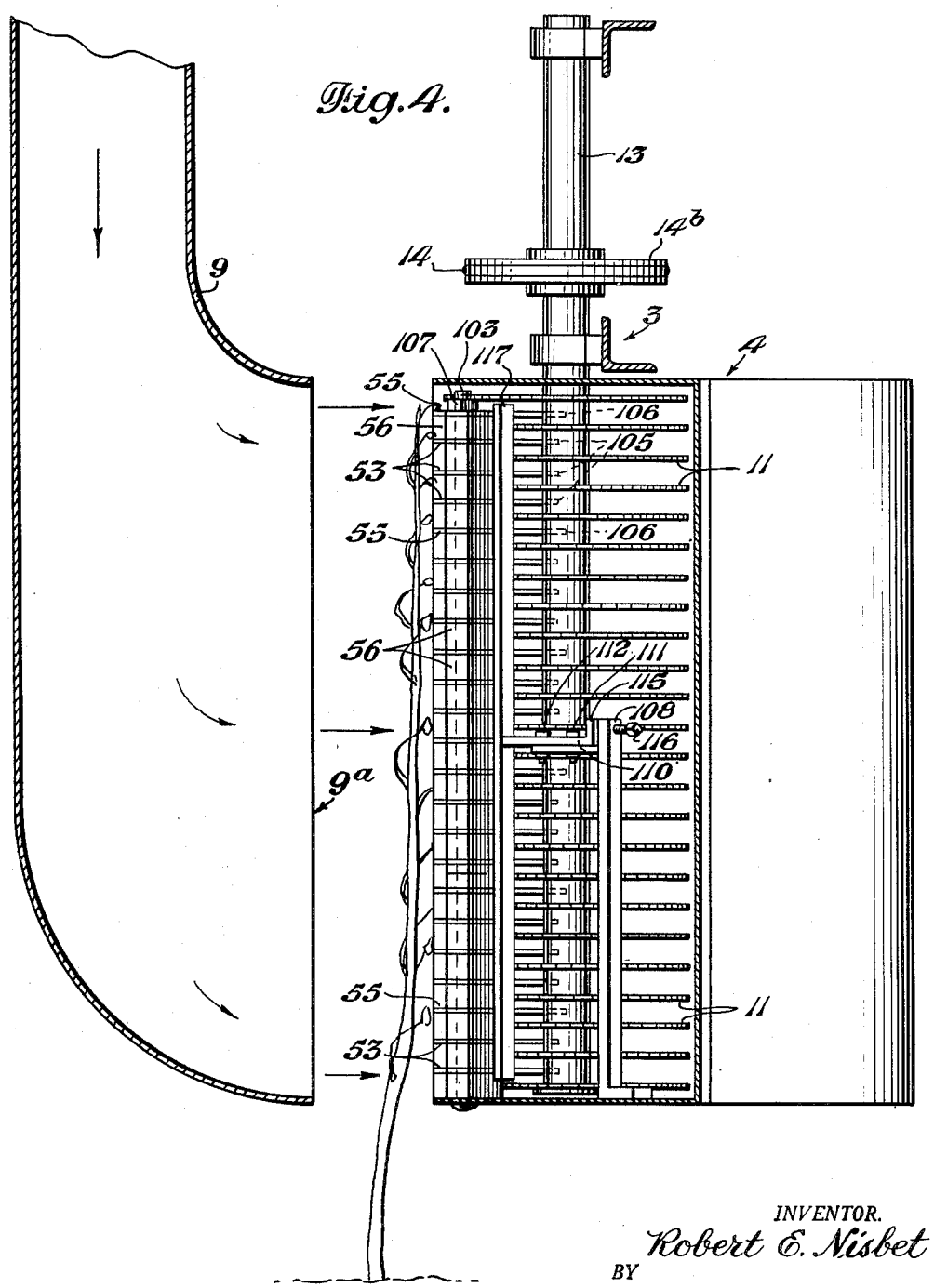

United States Patent Office 2,694,892
Patented Nov. 23, 1954

2,694,892

COTTON-PICKING MACHINE

Robert E. Nisbet, San Angelo, Tex.

Application April 30, 1952, Serial No. 285,293

9 Claims. (Cl. 56—30)

The invention relates to improvements in cotton picking machines, and particularly to improvements in the picking unit of a machine of the general type disclosed in the patent to A. R. Nisbet, Sr., No. 2,484,524, dated October 11, 1949, wherein a rotary toothed picker unit comprising a plurality of vertically spaced saws is mounted on the frame of a moving vehicle which is designed to be driven along a row of cotton plants, and which is provided with a fan or other means arranged to blow the bolls of the cotton plant against the rotary saws of the picking unit, which saws remove the lint from the bolls without injury to the plants, the force of the air blast serving also to transfer the lint or cotton fiber to a place of storage.

In accordance with the aforesaid Patent No. 2,484,524 the saws of the rotary picker unit are mounted on a central vertical shaft, and, interposed between successive saws and located above the uppermost saw of the unit and below the lowermost saw of the unit, untoothed guard disks having smooth peripheries are secured to the central shaft and rotate with the saws, such disks being of slightly greater diameter than the saws and being designed to guard and protect the cotton plants themselves from injury while permitting the lint to pass between the guard disks and to be engaged by the rotary saws by reason of the force of the air blast upon the bolls.

I have found that with picker units of this type including rotary guard disks, when plants are blown against the picker roll by the air blast all parts of the plant coming in contact with the revolving roll tend to pick up rotary movement and this tendency interferes with the proper removal of the lint or fiber from the boll. I have now found that with picker units of the spaced saw type functioning in conjunction with a strong air blast, guards which are mounted on a fixed part of the vehicle frame rather than on the rotary picker unit itself improve the picking operation.

An important feature of my invention accordingly resides in the improvement of the picking mechanism of Patent No. 2,484,524 by the use of guard fingers mounted on a fixed portion of the vehicle frame and extending rearwardly between the saws of the picking unit to protect the cotton plants as the bolls of cotton are blown against the unit by the force of the transverse air blast.

Another feature of my invention resides in improvements in the construction and mounting of the guard elements with reference to the saws of the picker unit.

I have found that a stationary guard offers the advantages of improved picking and a greater measure of protection for the cotton stalk and unripened bolls than do guard disks rotating with the saws. In the case of rotating guard disks, when the plants are blown against the revolving roll including both picker saws and guard disks, it will be apparent that all parts of the plant tend to pick up the rotary movement. With the stationary picking guards the surface prescribed to the plants constitutes a non-moving grill which imparts no motion to the boll and thus gives the saws a better chance to remove the cotton. Moreover, the stationary picking guards or fingers eliminate any abrasive action such as occurs in the case of revolving guard disks.

Other features and advantages of the invention will be apparent from a consideration of the accompanying drawings and the following detailed description in which a specific embodiment of the inventive thought is set forth by way of illustration rather than by way of limitation.

In the drawings:

Fig. 1 is a fragmentary plan view with parts broken away showing the improved cotton picking mechanism mounted on a machine of the type shown in Patent No. 2,484,524;

Fig. 2 is a plan view on a larger scale than Fig. 1, with parts broken away and shown in section, showing the cotton picking mechanism;

Fig. 3 is an enlarged vertical section approximately on line 3—3 of Fig. 2, but on a still larger scale, and with parts shown in elevation;

Fig. 4 is an enlarged section on line 4—4 of Fig. 2, with parts in elevation; and Fig. 5 is an exploded view showing two of the guard fingers and a spacing member.

The picker is shown applied to a tractor 1 which is shown in outline only and needs but a brief explanation. The numeral 2 represents longitudinal bars constituting portions of the frame of the tractor; 3 a portion of the frame of the picker; and 4 casing parts which support and enclose portions of the picker. In the present construction, as also in Patent No. 2,484,524, the casing 4 is more in the nature of a supporting frame for the various parts of the picker than an enclosing housing, and it may be, and preferably is, open through a substantial portion of its bottom and front end to allow the air blast to flow freely therethrough and to permit trash and foreign material to pass from the picker, and in this respect the casing 4 differs from the fluidtight conduits required where suction as distinguished from an air blast is relied upon to bring the bolls into contact with the picking unit, to remove the lint therefrom, and to transfer the picked cotton to a container or receptacle.

The tractor may be one of a well known type having front supporting and steering wheels $2^a$, rear supporting and driving wheels $2^b$, a suitable body $2^c$ in which an internal combustion or other suitable motor may be enclosed, a propeller shaft $2^d$ driven by the motor, and a differential gearing $2^e$ through which the rear wheels are driven from the propeller shaft. 5 is a power take-off shaft suitably driven from the tractor motor, and 6 is a countershaft suitably driven therefrom, as by a belt 7 passing about pulleys $7^a$ and $7^b$, from which countershaft the operating parts of the picker are driven.

A blast fan 8 is mounted on and driven by the shaft 6 and the casing $8^a$ of this fan has a discharge duct or conduit 9 whose outlet end or nozzle $9^a$ faces toward and is arranged in spaced relation to a rotary picker device 10 for cooperation therewith as hereinafter described. In the travel of the machine along a cotton row the parts 9 and 10 are disposed on opposite sides of a plant passageway A and the blast from the fan strikes each plant and forces the same against the picker device.

As shown, the picker unit 10 comprises a plurality of spaced saws 11 secured in any suitable manner to a vertical shaft shown suspended from the framework above, the saws being rotatable with the shaft and spaced from one another by suitable spacing means. The shaft 13 may be rotated in any suitable manner, as, for example, by a belt 14 coacting with a pulley $14^b$ secured to the shaft 13 above the saws, as more fully set forth in Patent No. 2,484,524. As herein disclosed, the saw teeth are disposed in the opposite direction from those of the picker unit in Patent No. 2,484,524, and the direction of rotation of the saws is also opposite to that disclosed in said patent, thus preventing damage to the plant. As shown, the picker unit is mounted at the inlet of a cotton transfer passage 100 intersecting the plant passage A at one end. An air blast from the nozzle $9^a$ located on the opposite side of the plant passage A from the picker unit 10 forces the plants within the passageway A against the picker unit. The rotating saws of the picker unit pull the lint from the bolls, and carry the same approximately 180°, at which point the air blast from the nozzle $9^a$, having passed between the spaced saws, blows the lint from the teeth of the saws and conveys such lint through the transfer passage to a suitable container (not shown) at the other end of the transfer passage carried by the vehicle on which the picker unit is mounted.

It will be noted that at the forward end of the vehicle inclined guard members or plant gatherers 101 are provided to deflect the cotton plants into the plant passage A as the picker is moved along a row of growing cotton. Mounted on the fixed floor portion 102 of the cotton picker at a point in advance of the picker unit and toward the guide members or plant gatherers 101 is an upright rod or shaft 103 parallel to the shaft 13 carrying the picker saws. Upon the rod 103 is mounted a plurality of spaced elongated guard members or fingers designated 53 and 55 extending rearwardly from the supporting rod or shaft 103 and so positioned as to extend between successive saws 11 of the picker unit, successive guard fingers being separated from one another by means of suitable spacers 56 mounted on the vertical rod 103. Although the guard fingers are herein shown as interposed between each successive pair of saws it is apparent that by making the spacing units larger a smaller number of guard fingers may be employed extending only between certain of the saws of the group. The vertical spacing of the guard fingers is determined according to the size of the bolls, which may vary according to the variety of cotton being picked, and this spacing may be varied by introducing spacers of different thicknesses to correspond with the requirements of the particular crop being picked.

As shown, the guard fingers 53 and 55 are of different shapes and lengths, the guard fingers 55 being longer than the fingers 53 and extending substantially the entire length of the inlet to the transfer passage 100 nearly to the wall 51 so as to prevent the cotton plants from being deflected into the transfer passage beyond the picker unit by the force of the air blast. It will be apparent that following the rush of a hard blast of air a venturi action causes other air to move along the edges of the transfer passage and there is a tendency for this following air to draw the growing plants into the transfer passage alongside the picker roll. This is prevented by means of the guard fingers.

As shown, the inner edges of both sets of guard fingers, that is, the edges which extend between the saws 11, are straight and may be positioned so as to pass close to the vertical rod 13 on which the saws are mounted while the outer edges which contact the plants are smoothly curved or bowed at least over a major portion of their length, the bowed portion conforming roughly to the curvature of the peripheries of the saws. The terminal portion 105 of the outer curve of each guard finger 53 intersects the straight inner portion in a point, while the terminal portion 106 of each of the guard members 55 is flattened for a short distance and is then rounded at the end, as indicated in the drawing. The individual guard fingers 53 and 55 and spacers 56 are clamped together upon the rod 103 by means of a nut 107 engaging the threaded upper end of the rod 103 so as to constitute a composite unit, the position of which may be angularly and accurately adjusted with reference to the vertical axis of the saw unit 10 by any suitable adjusting means. As shown, the adjusting means is mounted on a vertical post 108 carried upon the floor of the machine. This post is provided with a horizontal brace or arm 109 upon which is mounted an adjustable bar 110 adjustably secured to the arm 109 by bolts 111, 112 extending through slots 113, 114 formed in the bar 110. The rear end of the bar 110 is turned up as at 115 for engagement by an adjusting screw 116 threaded to the upper portion of the post 108. To the forward end of the bar 110 opposite the turned up portion 115 is secured a vertical stop member 117 adapted to simultaneously engage all the guard fingers 53 and 55 of the guard unit to prevent them from swinging further about the central axis of the upright rod 113 in a direction toward the vertical axis of the picker unit. The position of the stop member 117 may, of course, be adjusted by means of the adjusting screw 116. The tightness with which the guard fingers are clamped to the upright rod on which they are mounted may be varied by means of the adjusting nut at the upper portion thereof.

The invention has been described in detail for the purpose of illustration, but it will be obvious that numerous modifications and variations may be resorted to without departing from the spirit of the invention.

I claim:

1. In a cotton picking machine adapted to pass along a row of cotton plants, said machine having a plant passage extending lengthwise therethrough through which plants of a row are adapted to pass as the machine is moved along the row, and having a fiber transfer passage intersecting the plant passage having an inlet at one side of the plant passage, a rotary toothed picker comprising a plurality of vertically spaced saws located at the inlet of the transfer passage adjacent the plant passage, and blower means at the opposite side of the plant passage from said picker unit having its outlet arranged to direct an air blast transversely of the plant passage for blowing bolls of cotton against the picker unit; the improvement wherein guard fingers for the saws are provided, said fingers being mounted at one end adjacent to the picker unit and on the same side of the plant passage and extending across the inlet to the fiber transfer passage, between the spaced saws.

2. In a cotton picking machine adapted to pass along a row of cotton plants, said machine having a plant passage extending lengthwise therethrough through which plants of a row are adapted to pass as the machine is moved along the row, and having a fiber transfer passage intersecting the plant passage having an inlet at one side of the plant passage, a rotary toothed picker comprising a plurality of vertically spaced saws located at the inlet of the transfer passage adjacent the plant passage, and blower means at the opposite side of the plant passage from said picker unit having its outlet arranged to direct an air blast transversely of the plant passage for blowing bolls of cotton against the picker unit; the improvement wherein guard fingers for the saws are provided, said fingers being mounted at one end adjacent to the picker unit and on the same side of the plant passage and extending across the inlet to the fiber transfer passage, between the spaced saws, some at least of said guard fingers extending lengthwise beyond the saws substantially to the farther wall of the inlet passage.

3. In a cotton picking machine adapted to move along a row of cotton plants, said machine having a plant passage extending lengthwise therethrough through which plants of a row are adapted to pass as the machine is moved along the row, and having a fiber transfer passage intersecting the plant passage having an inlet at one side of the plant passage, a rotary toothed picker comprising a plurality of vertically spaced saws located at the inlet of the transfer passage adjacent the plant passage, and blower means at the opposite side of the plant passage from said picker unit having its outlet arranged to direct an air blast transversely of the plant passage for blowing bolls of cotton against the picker unit; the improvement wherein guard fingers for the saws are provided, said fingers being mounted at one end in advance of the picker unit on the same side of the plant passage and extending rearwardly across the inlet to the fiber transfer passage, between the spaced saws.

4. In a cotton picking machine adapted to pass along a row of cotton plants, said machine having a plant passage extending lengthwise therethrough through which plants of a row are adapted to pass as the machine is moved along the row, and having a fiber transfer passage intersecting the plant passage having an inlet at one side of the plant passage, a rotary toothed picker comprising a plurality of vertically spaced saws located at the inlet of the transfer passage adjacent the plant passage, and blower means at the opposite side of the plant passage from said picker unit having its outlet arranged to direct an air blast transversely of the plant passage for blowing bolls of cotton aaginst the picker unit; the improvement wherein guard fingers for the saws are provided, said fingers being mounted at one end adjacent to the picker unit and on the same side of the plant passage and extending across the inlet to the fiber transfer passage, between the spaced saws, said guard fingers bulging outwardly beyond the saws toward the plant passage to protect the plants from damage by the saws.

5. In a cotton picking machine adapted to pass along a row of cotton plants, said machine having a plant passage extending lengthwise therethrough through which plants of a row are adapted to pass as the machine is moved along the row, and having a fiber transfer passage intersecting the plant passage having an inlet at one side of the plant passage, a rotary toothed picker comprising a plurality of vertically spaced saws located at the inlet of the transfer passage adjacent the plant passage, and blower means at the opposite side of the plant passage from said picker unit having its outlet arranged to direct an air blast transversely of the plant passage for blowing bolls of cotton against the picker unit; the improvement wherein guard fingers for the saws are provided, said fingers being mounted at one end adjacent to the picker unit and on the same side of the plant passage and extending across the inlet to the fiber transfer passage, between the spaced saws, and means for angularly adjusting the position of said guard fingers.

6. In a cotton picking machine adapted to pass along a row of cotton plants, said machine having a plant passage extending lengthwise therethrough through which plants of a row are adapted to pass as the machine is moved along the row, and having a fiber transfer passage intersecting the plant passage having an inlet at one side of the plant passage, a rotary toothed picker comprising a plurality of vertically spaced saws located at the inlet of the transfer passage adjacent the plant passage, and blower means at the opposite side of the plant passage from said picker unit having its outlet arranged to direct an air blast transversely of the plant passage for blowing bolls of cotton against the picker unit; the improvement wherein guard fingers for the saws are provided, said fingers being mounted at one end adjacent to the picker unit and on the same side of the plant passage and extending across the inlet to the fiber transfer passage, between the spaced saws, and means for angularly adjusting the position of said guard fingers as a unit.

7. In a cotton picking machine adapted to move along a row of cotton plants, said machine having a plant passage extending therethrough through which plants are adapted to pass as the machine is moved along the row, and having a fiber transfer passage intersecting the plant passage having an inlet at one side of the plant passage, and a rotary toothed picker located at the inlet of the transfer passage, a guard unit for said picker comprising a plurality of guard fingers extending across said inlet to provide a grill surface which allows air and fiber to pass therebetween but prevents the stalks and unripe cotton bolls from coming in contact with the picker unit, and a vertical shaft carrying said guard fingers mounted on the machine adjacent the plant passage and beyond the inlet to the cotton transfer passage.

8. In a cotton picking machine adapted to pass along a row of cotton plants, said machine having a plant passage extending lengthwise therethrough through which plants of a row are adapted to pass as the machine is moved along the row, and having a fiber transfer passage intersecting the plant passage having an inlet at one side of the plant passage, a rotary toothed picker comprising a plurality of vertically spaced saws located at the inlet of the transfer passage adjacent the plant passage, and blower means at the opposite side of the plant passage from said picker unit having its outlet arranged to direct an air blast transversely of the plant passage for blowing bolls of cotton against the picker unit; the improvement wherein guard fingers for the saws are provided, said fingers being mounted at one end adjacent to the picker unit and on the same side of the plant passage and extending across the inlet to the fiber transfer passage, between the spaced saws, means for angularly adjusting the position of said guard fingers as a unit, and means for clamping said guard fingers to the vertical shaft.

9. In a cotton picking machine adapted to move along a row of cotton plants, said machine having a plant passage extending therethrough through which plants are adapted to pass as the machine is moved along the row, and having a fiber transfer passage intersecting the plant passage, and a rotary toothed picker located at the inlet of the transfer passage having an inlet at one side of the plant passage, a guard unit for said picker comprising a plurality of guard fingers extending across said inlet to provide a grill surface which allows air and fiber to pass therebetween but prevents the stalks and unripe cotton bolls from coming in contact with the picker unit, and a vertical shaft carrying said guard fingers mounted on the machine adjacent the plant passage and beyond the inlet to the cotton transfer passage, and adjusting means engaging said guard fingers to cause them to vary their angular position upon the vertical shaft.

References Cited in the file of this patent

UNITED STATES PATENTS

| Number | Name | Date |
|---|---|---|
| 1,078,328 | Appleby | Nov. 11, 1913 |
| 1,161,611 | Calderwood | Nov. 23, 1915 |
| 1,500,992 | Irwin | July 8, 1924 |
| 2,025,514 | Johnston | Dec. 24, 1935 |
| 2,387,004 | Berry | Oct. 16, 1945 |
| 2,427,155 | Nisbet, Sr. | Sept. 9, 1947 |
| 2,484,524 | Nisbet, Sr. | Oct. 11, 1949 |